(12) United States Patent
Hagisawa et al.

(10) Patent No.: US 9,274,732 B2
(45) Date of Patent: Mar. 1, 2016

(54) FORM PROCESSING SYSTEM, FORM CREATION DEVICE, AND COMPUTER READABLE MEDIUM

(75) Inventors: Shoichi Hagisawa, Ishikawa (JP); Go Dojo, Ishikawa (JP); Toshihiko Sugita, Ishikawa (JP); Yoshinori Kuwamura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 950 days.

(21) Appl. No.: 13/112,904

(22) Filed: May 20, 2011

(65) Prior Publication Data

US 2011/0286042 A1 Nov. 24, 2011

(30) Foreign Application Priority Data

May 24, 2010 (JP) ................................. 2010-118807
Oct. 12, 2010 (JP) ................................. 2010-230110

(51) Int. Cl.
*G06F 3/12* (2006.01)
*G06K 9/00* (2006.01)

(52) U.S. Cl.
CPC ............ *G06F 3/1285* (2013.01); *G06F 3/1208* (2013.01); *G06F 3/1243* (2013.01); *G06F 3/1256* (2013.01); *G06K 9/00449* (2013.01); *G06K 9/00973* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,509,092 A | 4/1996 | Hirayama et al. | |
| 7,886,219 B2* | 2/2011 | Lund | G06K 17/243 715/222 |
| 2004/0205641 A1* | 10/2004 | Shimizu | G06F 17/212 715/274 |
| 2006/0232804 A1* | 10/2006 | Furukawa | H04N 1/60 358/1.9 |
| 2008/0155394 A1 | 6/2008 | Sellman et al. | |
| 2009/0073482 A1* | 3/2009 | Tsuchiya | G06F 11/0733 358/1.14 |
| 2009/0190168 A1* | 7/2009 | Furuta | G06K 9/2054 358/1.15 |
| 2011/0286669 A1* | 11/2011 | Hagisawa | G06K 9/00449 382/182 |

FOREIGN PATENT DOCUMENTS

| | | |
|---|---|---|
| CN | 1525378 A | 9/2004 |
| CN | 1609863 A | 4/2005 |
| EP | 0547804 A1 | 6/1993 |
| JP | 2979109 B2 | 6/1994 |

(Continued)

OTHER PUBLICATIONS

China Patent Office Action, dated Sep. 4, 2013, corresponding to Application No. 201110136191.0.
Chinese Patent Office, Office Action, 201110136191.0 (corresponding to application in Chinese), mailed Mar. 17, 2014 [English Translation].

(Continued)

*Primary Examiner* — Hilina K Demeter
(74) *Attorney, Agent, or Firm* — Hogan Lovells US LLP

(57) ABSTRACT

There is provided a form processing system including a form creation device and a printer, wherein the form creation device includes a layout generation unit that generates layout information denoting a layout of a form, a drawing instruction unit that causes a drawing performing unit in the printer to generate referential image data which corresponds to at least part of the generated layout information, based on the generated layout information, and an image transmission unit that transmits the generated referential image data to an OCR device, and the printer includes the drawing performing unit that generates the referential image data in accordance with an instruction from the drawing instruction unit.

12 Claims, 13 Drawing Sheets

(56) References Cited

FOREIGN PATENT DOCUMENTS

| | | |
|---|---|---|
| JP | 07-160804 A | 6/1995 |
| JP | 08-030659 | 2/1996 |
| JP | 10-261040 A | 9/1998 |
| JP | 2000-132542 | 5/2000 |
| JP | 2000132542 A | 5/2000 |
| JP | 2004-227255 A | 8/2004 |

OTHER PUBLICATIONS

Japan Office Action dated Jan. 7, 2014 corresponding to JP2010-230110.

Chinese Office Action mailed Sep. 24, 2014, corresponding to Chinese Application No. 201110136191.0. English Translation.

* cited by examiner

FIG.4

(a) Character frame 182a

| Layout ID | Form ID | Reference point coordinates | Matrix | Dimension | Line width | Line type | Color |
|---|---|---|---|---|---|---|---|
| L00563 | F00885 | (x1,y1) | 5x20 | 200x300 | 1pt | Solid line | Black |
| L00564 | F00885 | (x2,y2) | 1x1 | 150x2000 | 1.5pt | Solid line | Green |
| L00565 | F00885 | (x3,y3) | 2x1 | 10x200 | 2pt | Broken line | Black |
| ⋮ | ⋮ | ⋮ | ⋮ | ⋮ | ⋮ | ⋮ | ⋮ |

(b) Character 182b

| Layout ID | Form ID | Reference point coordinates | Size | Contents |
|---|---|---|---|---|
| C02355 | F00885 | (x4,y4) | 10pt | Year, Month, Day |
| C02356 | F00885 | (x5,y5) | 11pt | Purchase slip |
| C02357 | F00885 | (x6,y6) | 5pt | Money amount |
| ⋮ | ⋮ | ⋮ | ⋮ | ⋮ |

(c) Input region 184

| Layout ID | Form ID | Reference point coordinates | Dimension | Character type | Attributes | Color |
|---|---|---|---|---|---|---|
| A00532 | F00885 | (x7,y7) | 200x300 | Alphabet | Type | Gray |
| A00533 | F00885 | (x8,y8) | 150x2000 | Japanese | Handwriting | Gray |
| A00534 | F00885 | (x9,y9) | 150x150 | Symbol | Handwriting | Light brown |
| ⋮ | ⋮ | ⋮ | ⋮ | ⋮ | ⋮ | ⋮ |

| Layout ID | Form ID | Reference point coordinates | Dimension | Character type | Attributes |
|---|---|---|---|---|---|
| A00532 | F00885 | (x7,y7) | 200x300 | Alphabet | Type |
| A00533 | F00885 | (x8,y8) | 150x2000 | Japanese | Handwriting |
| A00534 | F00885 | (x9,y9) | 150x150 | Symbol | Handwriting |
| ⋮ | ⋮ | ⋮ | ⋮ | ⋮ | ⋮ |

(b)

| Layout ID | Success-or-failure in readout |
|---|---|
| A00532 | Success |
| A00533 | Success |
| A00534 | Failure |
| ⋮ | ⋮ |

(c)

| Layout ID | Size | Contents |
|---|---|---|
| A00532 | 10 points | Test character |
| A00533 | 14 points | Test character |
| A00534 | - | ○ |
| ⋮ | ⋮ | ⋮ |

FORM PROCESSING SYSTEM, FORM CREATION DEVICE, AND COMPUTER READABLE MEDIUM

CROSS-REFERENCE TO RELATED APPLICATIONS

This application is based on and claims priority under 35 USC 119 from Japanese Patent Application No. 2010-118807 filed May 24, 2010 and Japanese Patent Application No. 2010-230110 filed Oct. 12, 2010.

BACKGROUND OF THE INVENTION

Field of the Invention

The present invention relates to a form processing system, form creation device, and computer readable medium.

SUMMARY OF THE INVENTION

According to an aspect of the invention, there is provided a form processing system including a form creation device and a printer, wherein the form creation device includes a layout generation unit that generates layout information denoting a layout of a form, a drawing instruction unit that causes a drawing performing unit in the printer to generate referential image data which corresponds to at least part of the generated layout information, based on the generated layout information, and an image transmission unit that transmits the generated referential image data to an OCR device, and the printer includes the drawing performing unit that generates the referential image data in accordance with an instruction from the drawing instruction unit.

BRIEF DESCRIPTION OF THE DRAWINGS

Exemplary embodiments of the present invention will be described in detail based on the following figures, wherein:

FIG. 4 is an explanatory table of layout information (characteristics information and data attributes information);

FIG. 9 is an explanatory table of reform information;

DESCRIPTION OF THE PREFERRED EMBODIMENTS

Figure 1:
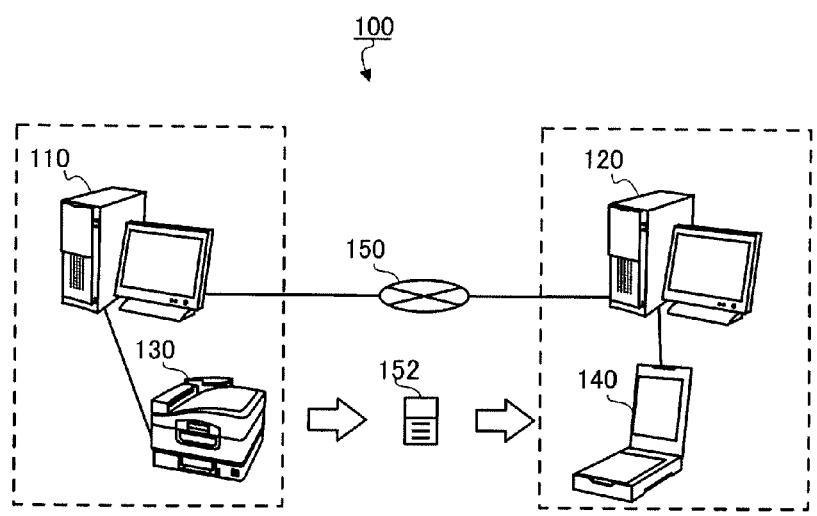
FIG. 1 is an explanatory diagram showing outlined connections in a form processing system.

The following will describe in detail a preferred embodiment of the present invention with reference to the accompanying drawings. It is understood that dimensions, materials, and other specific numerals given in the present embodiment are illustrative of the present invention for ease of explanation unless otherwise specified and details contained therein are not to be construed as limitations on the present invention. It is to be noted that identical reference numerals are given to the essentially the identical components in the present specification and drawings, and description thereof will not be repeated here.

(Form Processing System 100)

FIG. 1 is an explanatory diagram showing outlined connections in the form processing system 100. The form processing system 100 includes a form creation device 110, an OCR device 120, a printer 130, and a scanner 140. The form creation device 110 is connected with the OCR device 120 via a communication network 150 such as the internet, a local area network (LAN), or a dedicated line. The form creation device 110 is also connected with the printer 130 and the OCR device 120 is connected with the scanner 140 via, for example, the LAN.

If having received a user's input for creation of a layout, the form creation device 110 generates layout information (information about layout) that denotes the layout of a form 152. Then, the printer 130 prints the form 152 having the generated layout information. The user writes down, for example, job-related information onto the printed-out form 152 by handwriting, imprinting, or stamping. If the form 152 is completed in writing, the scanner 140 reads the form 152 having the information written on it, which image data then undergoes OCR processing in the OCR 120, which thereby acquires the information written on the form 152.

For example, a form creation device is proposed that automatically generates a format of the form in accordance with the model of the OCR device, the number of line fields, and the number of characters entered manually by the user. However, such a form creation device only automatically adjusts the character frame and the form size of a form to be created, leading to a troublesome job of identifying the OCR device model etc. Furthermore, in the case of reading forms of the same layout repeatedly, the user must notify the OCR device of, for example, a position at which a target form is read, in order to improve the accuracy in OCR processing.

Further, the accuracy in OCR processing can be improved also by comparing the image data read by the scanner 140 and to be subject to the OCR processing and image data to be referenced in OCR processing (hereinafter referred to as referential image data) to each other and correcting displacement and tilting in the image data.

The referential image data is generated using the drawing functions provided in the form creation device. This drawing functions of the form creation device 110 use an inherent image generation engine different from the printer 130; therefore, this referential image data may differ in detail from a form actually printed with the printer 130 in some cases. The different printers 130 might have, for example, different printable regions, origin positions, font types and sizes, pixel interpolation means in resolution conversion, etc., which would possibly lead to a failure in correction of displacement or tilting and a deterioration in OCR processing accuracy.

In the form processing system 100 according to the present embodiment, layout information, if generated in the form creation device 110, is used in common in OCR processing by the OCR device 120. In particular, in the case of using referential image data, the form creation device 110 generates the referential image data more similar to a form actually printed with the printer 130 and transmits it to the OCR device 120. Therefore, in the present form processing system 100, it is possible to improve the accuracy in OCR processing while reducing work burdens on the user. The following will describe in detail the configurations of the respective form creation device 110 and OCR device 120 in this order.

(Form Creation Device 110)

Figure 2:
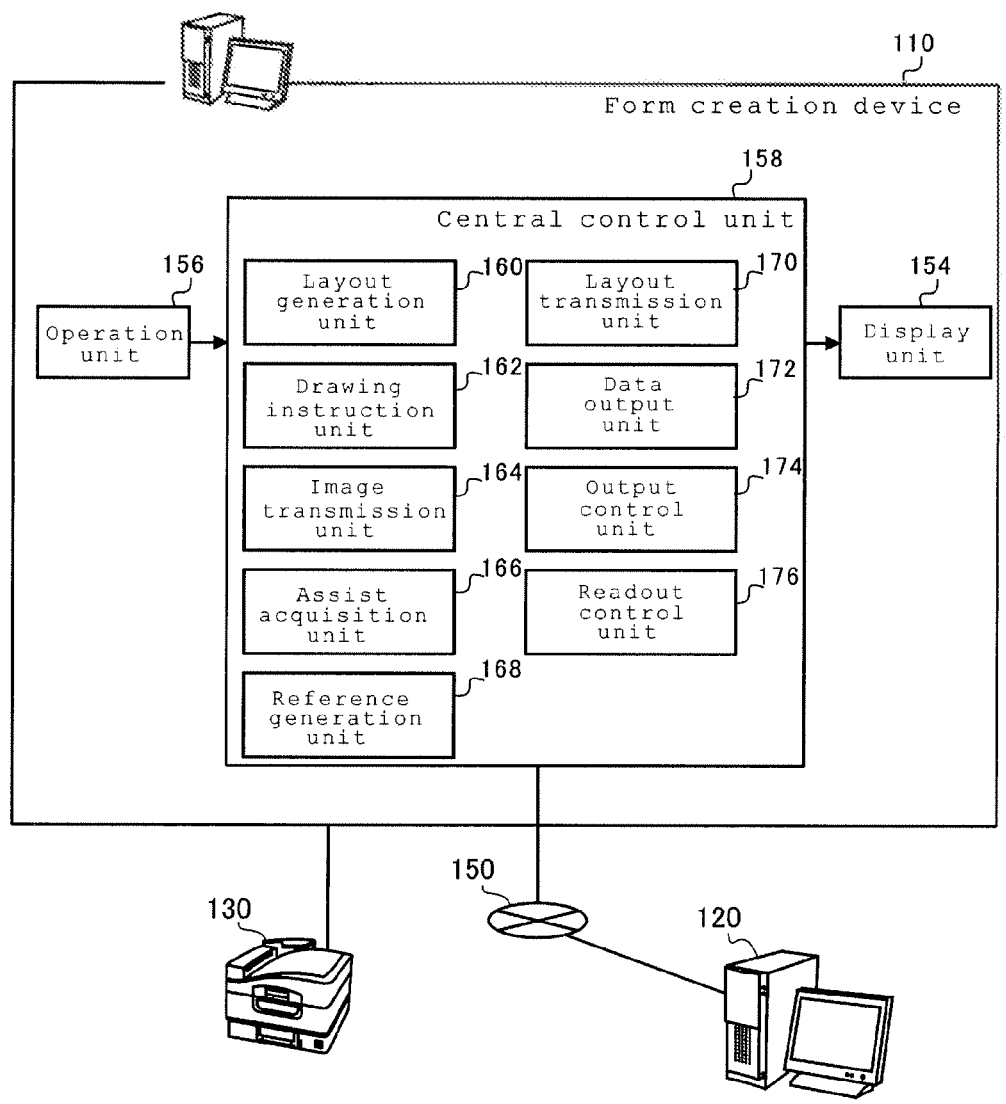
FIG. 2 is a functional block diagram showing a configuration of a form creation device.

FIG. 2 is a functional block diagram showing the configuration of the form creation device 110. The form creation device 110 includes a display unit 154, an operation unit 156 and a central control unit 158.

The display unit 154 is constituted of an LCD, an organic electro luminescence display, etc. The operation unit 156 is constituted of a touch panel mounted on the display surface of the display unit 154, a keyboard mounted with a plurality of operation keys, a pointing device such as a mouse, an arrow key, or a joystick. The form creation device 110 displays a form creation screen on the display unit 154, to receive a user's input through the operation unit 156, thereby generating a layout of the form 152.

Figure 3:
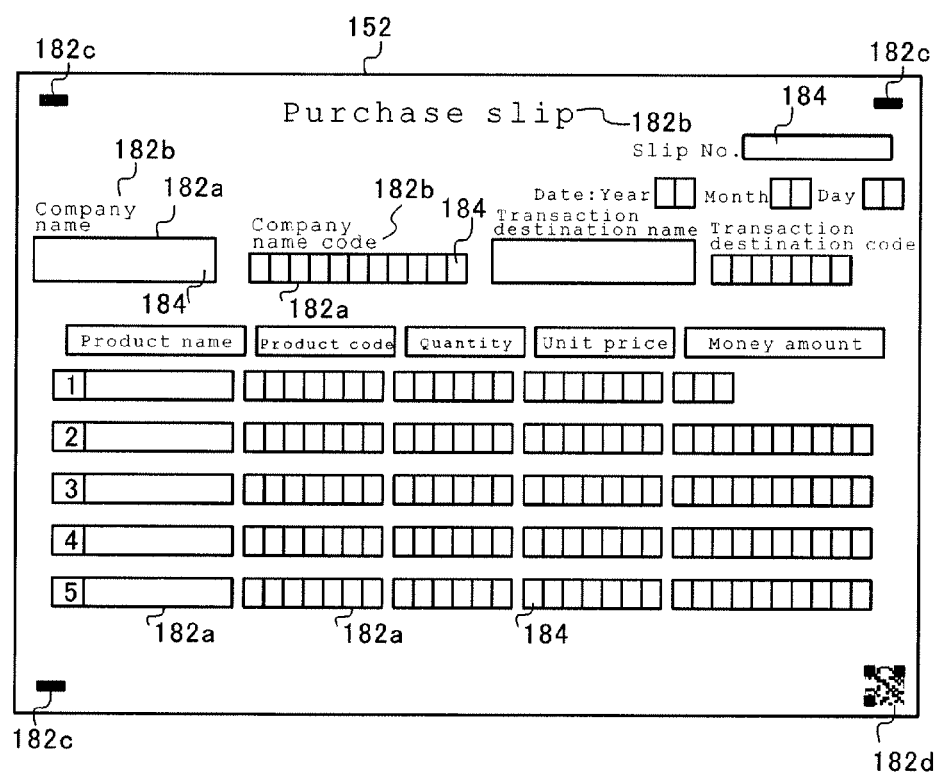
FIG. 3 is an explanatory view showing one example of a form layout.

FIG. 3 is an explanatory view showing one example of a layout. As shown in FIG. 3, the layout of form 152, for example, a character frame 182*a*, a character 182*b*, a reference mark 182*c*, a barcode 182*d* is set. It is to be noted that the reference marks 182*c* provide references for the direction and layout position of the form 152 when the OCR device 120 performs OCR processing on image data read by the scanner 140. Further, the barcode 182*d* is obtained by encoding arbitrary information in accordance with predetermined rules and denotes, for example, a form ID that identifies the form 152.

The form creation device 110 generates a layout such as shown in FIG. 3 in response to user's input through the operation unit 156. In this case, the form 152 includes a plurality of input regions 184 summarizing input aspects with regularities. The input region 184 is enclosed by, for example, the character frame 182*a*. The input region 184 is capable of setting in it the type of characters (alphabet, number, Japanese, symbol, etc.), the attributes (handwritten character, type, etc.), etc. assumed to be written.

The central control unit 158 controls the entire form creation device 110 by using a semiconductor integrated circuit incorporating a central processing unit (CPU), an ROM storing a program etc., and an RAM serving as a working area, etc. Further, the central control unit 158 functions also as a layout generation unit 160, a drawing instruction unit 162, an image transmission unit 164, an assist acquisition unit 166, a reference generation unit 168, a layout transmission unit 170, a data output unit 172, an output control unit 174, and a readout control unit 176.

The layout generation unit 160 generates layout information that denotes the layout of the form 152 in accordance with a layout set by a user's input through the operation unit 156.

The layout information contains characteristics information and OCR attributes information. The characteristics information denotes layout characteristics such as comments (dictionary) and sets the position, the line type, etc. of, for example, a ruled line and a character. The OCR attributes information denotes the data attributes of a position subject to OCR processing (hereinafter referred to as OCR position) and a character, a symbol, etc. subject to this OCR processing. The following will describe the characteristics information and the OCR attributes information with reference to FIG. 4.

FIG. 4 is an explanatory table of layout information (characteristics information and data attributes information). In particular, FIG. 4A shows layout information (characteristics information) of the character frame 182*a*, FIG. 4B shows layout information (characteristics information) of the character 182*b*, and FIG. 4C shows layout information (OCR attributes information) of the input region 184. As shown in FIG. 4A, the layout information of the character frame 182*a* is made of, for example, a layout ID 190*a*, a form ID 190*b*, a reference point coordinate 190*c*, a matrix 190*d*, a dimension 190*e*, a line width 190*f*, a line type 190*g*, a color 190*h*, etc.

The layout ID 190*a* is identification information that identifies the corresponding character frame 182*a*. The form ID 190*b* is identification information that identifies layout information which the form 152 is based on. The reference point coordinate 190*c* denotes coordinates of a reference point of the corresponding character frame 182*a*, for example, the lower left point of the character frame 182*a*. In the present embodiment, the coordinate system has an x-axis and a y-axis as its horizontal and vertical directions respectively on the assumption that the lower left reference mark 182*c* of the form 152 is its origin. The matrix 190*d* denotes the respective numbers of rows and columns in a case where a region surrounded by the corresponding character frame 182*a* is subdivided. Further, the layout information (characteristics information) may set the character frame 182*a* not in table units but in units of a block obtained by subdividing the region surrounded by this character frame 182*a*.

The size 190*e* denotes, for example, the width and the height of a block obtained by subdividing a table surrounded by the character frame 182*a* and, if the width and the height differ with the different rows and columns, is set for each of the rows or columns. Similarly, if the line width 190*f*, the line type 190*g*, and the color 190*h* of the character frame 182*a* differ with the different rows and columns, they are set for each of the rows or columns. In this case, if the line width 190*f*, the line type 190*g*, and the color 190*h* of the character frame 182*a* are different between the adjacent rows or columns, in the sandwiched character frame 182*a*, priority is given to the settings that are later made by a user's input. Further, besides the character frame 182*a* closed by ruled lines on all four sides, the rules lines can be set independently.

As shown in FIG. 4B, the layout information of the character 182*b* is made of, for example, the layout ID 190*a*, the form ID 190*b*, the reference point coordinate 190*c*, a size 190*i*, a content 190*j*, etc. The size 190*i* denotes the size of the character 182*b* and the content 190*j* is the character 182*b* itself actually printed, such as "purchase slip", "year", "month, or "day". Further, if the character 182*b* is variable because it happens to be, for example, a sequential slip number or a customer number which is different with each customer, the layout information may contain variable information that denotes change rules of the character 182*b*.

As shown in FIG. 4C, the layout information of the input region 184 is made of, for example, the layout ID 190*a*, the form ID 190*b*, the dimension 190*e*, a character type 190*k*, an attribute 190*l*, a color 190*m*, etc. The character type 190*k* denotes, as described above, the type of a character assumed to be written and can set, for example, an alphabet, a number, a Hiragana, a Katakana, a symbol, Japanese, etc. The attribute 190*l* can set a handwritten character if handwriting is employed in writing, a type if printing or data sealing is employed, etc.

The layout information (characteristics information and data attributes information) shown in FIG. 4 is just one example and contains the reference mark 182*c* and the barcode 182*d* as well as various information settings of various elements that can be written in the form 152. Further, for example, the characteristics information may be expressed in various data formats including, for example, the page description language (PDL).

The aforementioned referential image data is image data obtained by imaging (rasterizing) a layout set by a user's input in a bitmap format etc. by use of, for example, the RGB or MYK color specification system. However, as described above, the drawing functions of the form creation device 110 use the inherent image generation engine different from the printer 130, so that, the referential image data may differ in detail from a form actually printed with the printer 130 in some cases. This may lead to deteriorations in OCR processing accuracy. To solve the problem, the form creation device 110 in the present embodiment is equipped with the drawing instruction unit 162.

The drawing instruction unit 162 instructs the later-described drawing performing unit in the printer 130 to generate referential image data that corresponds to at least part of layout information based on the layout information.

In such a manner, the drawing instruction unit 162 in the present embodiment instructs the drawing performing unit assuming the drawing functions in the printer 130 to generate referential image data. In such a configuration, it is possible to generate referential image data that matches characteristics of the individual print functions of the printer 130, for example, the printable regions, origin positions, font types and sizes, pixel interpolation means in resolution conversion, etc., to securely correct displacement and tilting, thereby improving the accuracy in OCR processing.

Further, the drawing instruction unit 162 inputs a print job and calls up the drawing performing unit to cause it to generate referential image data based on the print job and, when the generated referential image data is acquired completely, cancels the print job.

In such a configuration, it is possible to generate referential image data by using the functions to input and cancel a print job without adding a new function to the printer 130, thereby realizing the form processing system with more inexpensive costs.

If there are a plurality of the drawing performing units, the drawing instruction unit 162 causes any one of the followings; all of those drawing performing units to generate referential image data; only predetermined one of them to generate it; all of them to generate and combine them, or only user-selected one of them to generate it. It is to be noted that the combining of the referential image data means to add (work out a sum of), for example, monochromatic bitmap-format image data values for each dot. This configuration enables to generate referential image data that is suitable for a user's purpose of utilization.

Although referential image data in the present embodiment will be described with a specific example where it is image data in a bitmap format that matches the entire form, the present invention is not limited to it. The referential image data may be image data of part of the form (characteristic partial image such as a logo or a large character) or a combination of those partial image data or their metadata. That is, the referential image data according to the present invention may include image data of the entire form, partial image data contained in the form, and partial image data and its attribute information (positions or image types) contained in the form.

The image transmission unit 164 transmits referential image data generated by the drawing instruction unit 162 to the OCR device 120.

The assist acquisition unit 166 acquires assist information transmitted from the later-described OCR device 120. If the assist acquisition unit 166 has acquired assist information, the layout generation unit 160 can generate layout information based on the assist information. The assist information contains algorithm information about an algorithm used in the OCR processing unit in the OCR device 120, which information may be, for example, the model name of the OCR device 120 or the name or version of OCR processing software used in the OCR processing unit in the OCR device 120.

The layout generation unit 160 applies restrictions on the layout information in accordance with the algorithm information acquired by the assist acquisition unit 166. For example, in the case of allocating the character frame 182a in accordance with a user's input, the layout generation unit 160 provides a lower limit value on the line width 190f of that character frame 182a. If the algorithm information is the name and the version of the OCR processing software, this lower limit value is set based on a performance of an algorithm identified by those OCR processing software and version.

Similarly, based on the algorithm information, the layout generation unit 160 applies restrictions on set items such as the size 190i and the location (reference point coordinate 190c) of the reference mark 182c, the size 190i of the barcode 182d, a dropout color not read by the scanner 140, the character type 190k, and the attribute 190l. Further, if the location of elements such as the character frame 182a is instructed by the user, the layout generation unit 160 may set on the basis of the algorithm information the initial values of the aforementioned set items contained in the layout information of those elements.

This configuration employing algorithm information reduces the number of times of repeating operations to conduct tests for confirmation of the accuracy in OCR processing on the form 152 and modifying the layout information based on the test results of the OCR processing, thereby greatly mitigating the work burdens on the user.

The reference generation unit 168 generates reference data that provides a reference for comparison to the results of OCR processing in the OCR device 120, based on the layout information generated by the layout generation unit 160. The reference data will be described later.

The layout transmission unit 170 transmits the layout information and the reference data to the OCR device 120. The data output unit 172 provides the printer 130 with the layout information after converting it into a format appropriate for printing out.

In a case where the form 152 is to be printed, the output control unit 174 controls the printer 130 so that it may print under predetermined printing conditions. Not limited to the case of directly controlling the printer 130, the output control unit 174 may provide the printer 130 with control information such as printing conditions that prohibits changes so that the printer 130 can set the printout conditions based on the control information.

If, for example, reduced printing is conducted owing to a careless change in printout conditions in the printer 130, the OCR processing accuracy may possibly be deteriorated due to a reduction in character size or line width in the printed form 152. Such a situation can be avoided by the output control unit 174 conducting control on the printer 130 so that it may perform printing under the predetermined printout conditions.

The readout control unit 176 provides the scanner 140 with specification information that specifies a resolution with which the scanner 140 reads the form 152 to convert it into image data as well as an application and commands to be executed after the readout, through the communication network 150. Not limited to such a case of providing through the communication network 150, the readout control unit 176 may embed the specification information in the form 152 as, for example, the barcode 182d so that the scanner 140 can acquire this specification information from that barcode 182d.

By such a configuration of including the readout control unit 176, it is possible to generate image data at a resolution appropriate for the OCR processing and to correct the generated image data by using applications and commands of the scanner 140, thereby further improving the OCR processing accuracy.

(Printer 130)

Figure 5:
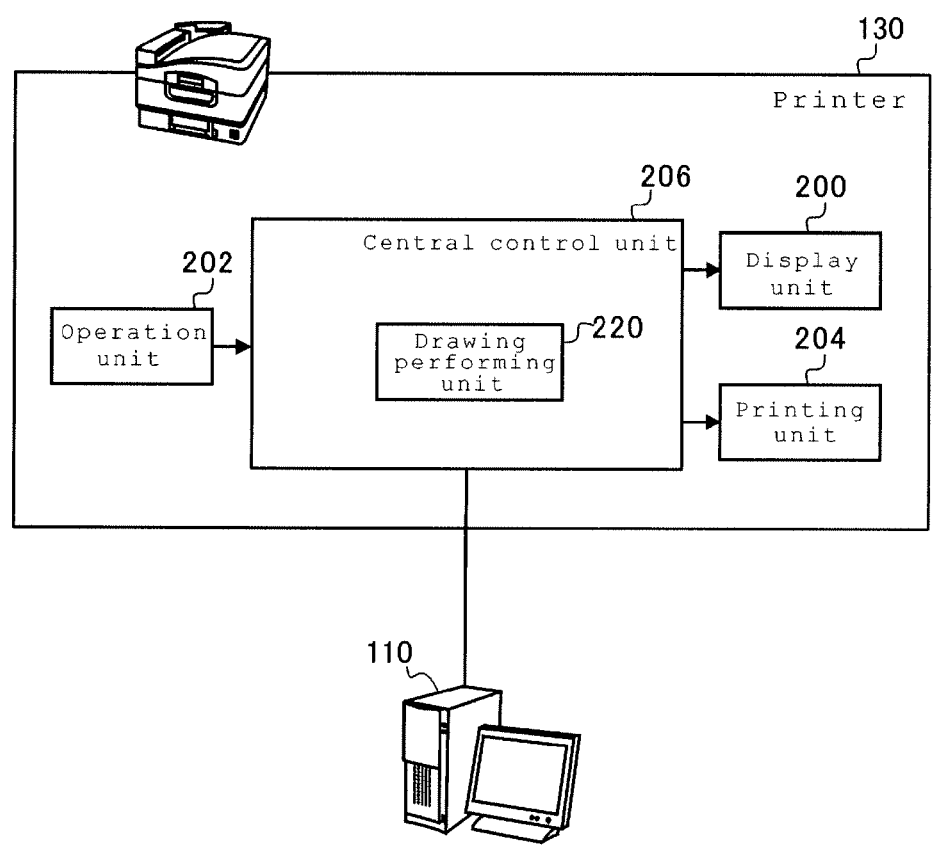
FIG. 5 is a functional block diagram showing a configuration of a printer.

FIG. 5 is a functional block diagram showing a configuration of the printer 130. The printer 130 includes a display unit 200, an operation unit 202, a printing unit 204, and a central control unit 206.

The display unit 200 is constituted of a liquid crystal display (LCD), an organic electro-luminescence (EL) display, etc. The operation unit 202 is constituted of a touch panel mounted on the display surface of the display unit 200, a keyboard mounted with a plurality of operation keys, a pointing device such as a mouse, an arrow key, or a joystick. The printing unit 204 prints a received image after it is rasterized with the later-described drawing performing unit 220.

The central control unit 206 controls the entire printer 130 by using a semiconductor integrated circuit (IC) incorporating a central processing unit (CPU), an ROM storing a program etc., an RAM serving as a work area, etc. Further, the central control unit 206 functions also as the drawing performing unit 220.

The drawing performing unit 220 images (rasterizes) a print job (image data) transmitted from the form creation device 110 into a bitmap format using, for example, the CMYK color specification system. In the present embodiment, the drawing performing unit 220 generates the aforementioned referential image data in response to an instruction from the drawing instruction unit 162 in the form creation device 110 and, in response to a print-job cancel instruction from the drawing instruction unit 162, transmits the referential image data to the drawing instruction unit 162 rather than the printing unit 204.

Although this example has been described with a configuration of using the drawing performing unit 220 equipped in the printer 130, a printer driver for the printer 130 installed in the form creation device 110 or any other computer may be caused to function as the drawing performing unit 220.

Moreover, such a configuration may be employed as to equip the drawing performing unit in the form creation device. The following will describe the configuration to equip the drawing performing unit in the form creation device with reference to FIGS. 6 and 7.

(Printer 300 and Form Creation Device 350)

Figure 6:
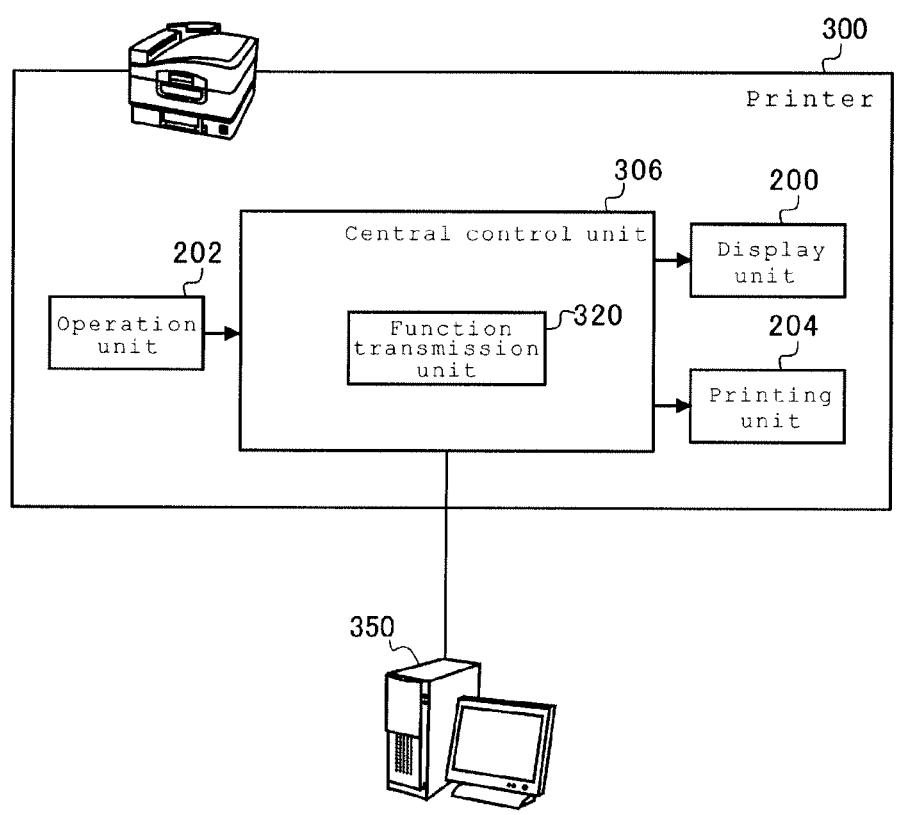
FIG. 6 is a functional block diagram showing a configuration of another printer.
Figure 7:
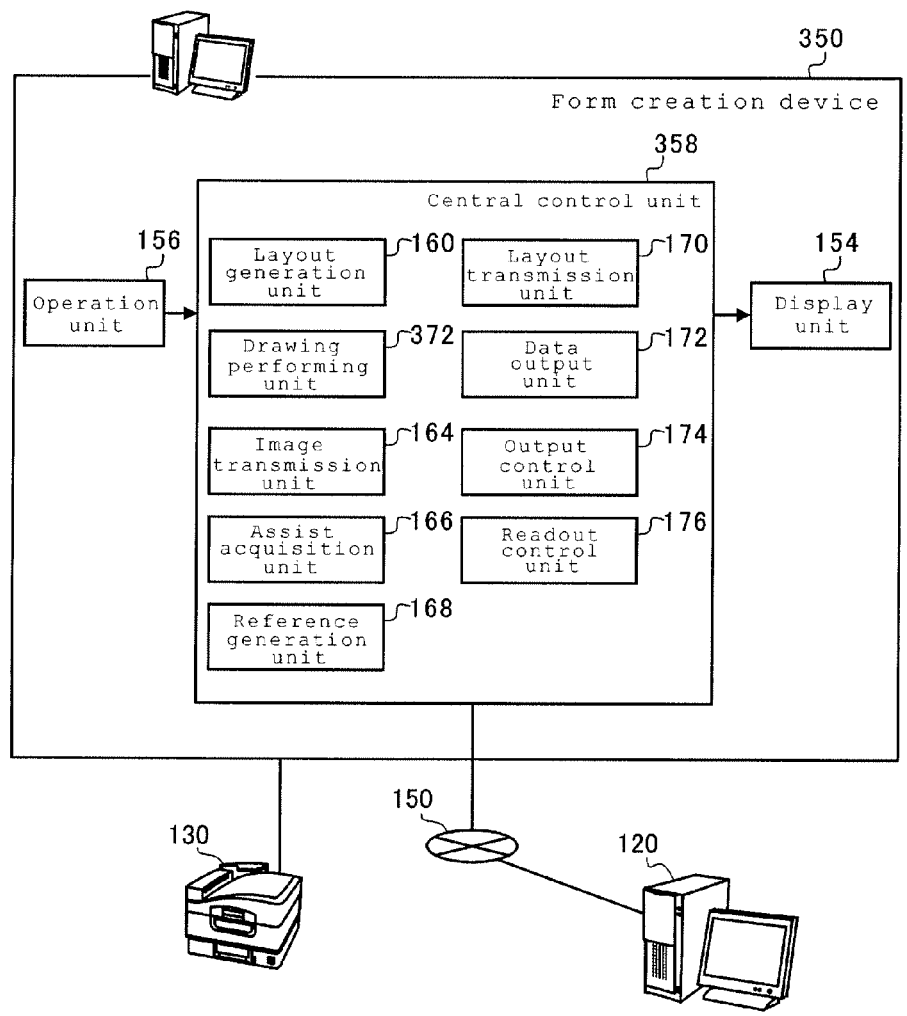
FIG. 7 is a functional block diagram showing a configuration of another form creation device.

FIG. 6 is a functional block diagram showing the configuration of another printer 300 and FIG. 7 is a functional block diagram showing another form creation device 350. The printer 300 includes the display unit 200, the operation unit 202, the printing unit 204, and a central control unit 306. The form creation device 350 includes the display unit 154, the operation unit 156, and a central control unit 358.

The display unit 200, the operation unit 202, and the printing unit 204 in the printer 300 and the display unit 154, the operation unit 156 in the form creation device 350, and the layout generation unit 160, the image transmission unit 164, the assist acquisition unit 166, the reference generation unit 168, the layout transmission unit 170, the data output unit 172, the output control unit 174, and the readout control unit 176 in the central control unit 358 are essentially the same in function as those described above as the components of the printer 130 and the form creation device 110, and the repetitive description on them will be omitted.

The central control unit 306 in the printer 300 controls the entire printer 300 by using a semiconductor IC incorporating a central processing unit (CPU), an ROM storing a program etc., an RAM serving as a work area, etc. Further, the central control unit 306 functions also as a drawing transmission unit 320.

The function transmission unit 320 transmits print function information that denotes the print functions to the form creation device 350. The print function information specifically denotes supporting print functions such as, for example, a resolution of the printer 300, a printing range, and dithering.

The central control unit 358 in the form creation device 350 controls the entire form creation device 350 by using a semiconductor IC incorporating a central processing unit (CPU), an ROM storing a program etc., an RAM serving as a work area, etc. Further, the central control unit 358 functions also as the layout generation unit 160, the drawing performing unit 372, the image transmission unit 164, the assist acquisition unit 166, the reference generation unit 168, the layout transmission unit 170, the data output unit 172, the output control unit 174, and the readout control unit 176.

The drawing performing unit 372 generates referential image data that corresponds to at least part of layout information based on the print function information and the layout information.

Even by use of such printer 300 and form creation device 350, influences due to printer-specific differences in function can be inhibited to more securely correct displacement and tilting, thereby improving the accuracy in OCR processing. Moreover, it is also possible to conduct fine adjustment on rasterizing processing as occasion demands so that the form creation device 350 may generate referential image data.

(OCR Device 120)

Figure 8:
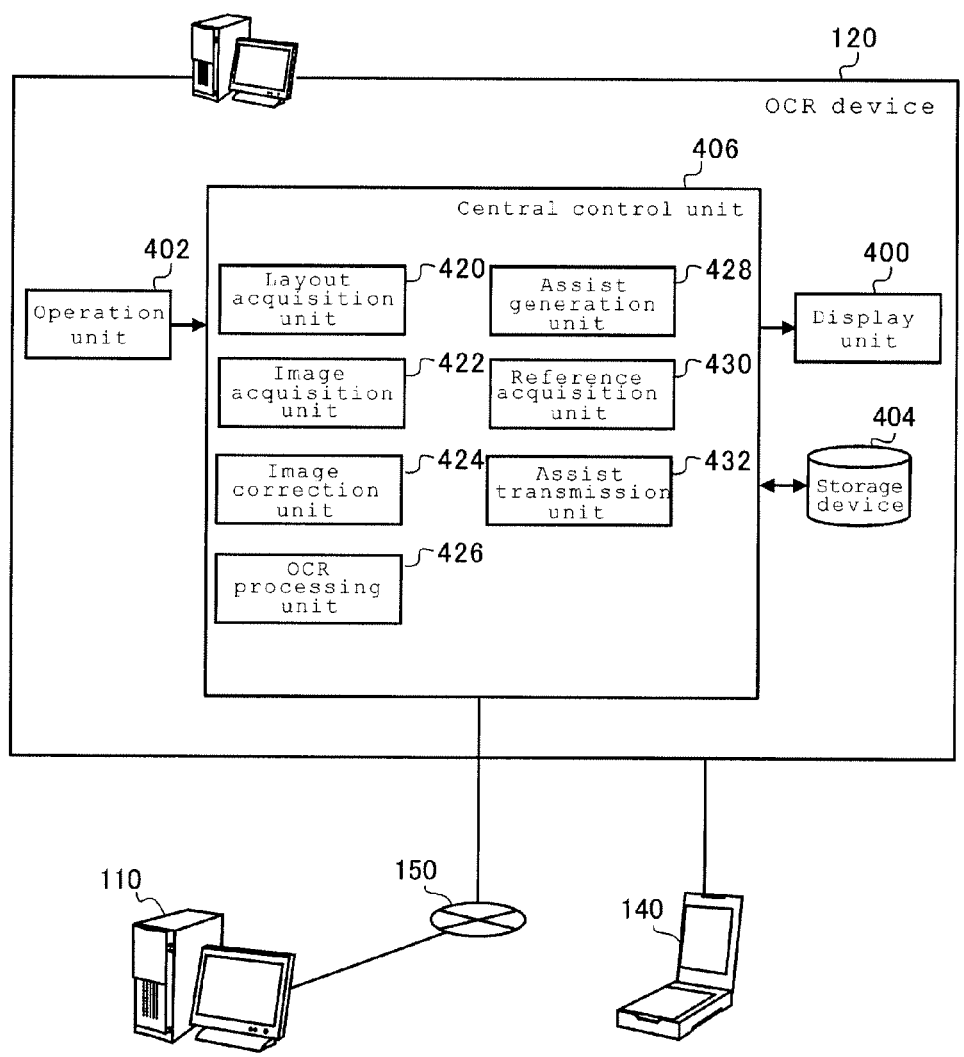
FIG. 8 is a functional block diagram showing a configuration of an OCR device.

FIG. 8 is a functional block diagram showing a configuration of the OCR device 120. The OCR device 120 includes a display unit 400, an operation unit 402, a storage device 404 and a central control unit 406.

The display unit 400 is constituted of an LCD, an organic EL display, etc. The operation unit 402 is constituted of a touch panel mounted on a display surface of the display unit 400, a keyboard mounted with a plurality of operation keys, a pointing device such as a mouse, an arrow key, or a joystick.

The storage device 404 stores layout information etc., being constituted of a hard disk drive (HDD), a flash memory, a nonvolatile random access memory (RAM), etc. In the present embodiment, the storage device 404 is formed integrally with the OCR device 120 but not restricted to this aspect and may be, for example, a separate network attached storage (NAS) or an external HDD or universal serial bus (USB) memory.

The central control unit 406 controls the entire OCR device 120 by using a semiconductor integrated circuit incorporating a central processing unit (CPU), an ROM storing a program etc., and an RAM serving as a working area, etc. Further, the central control unit 406 functions also as a layout acquisition unit 420, an image acquisition unit 422, an image correction unit 424, an OCR processing unit 426, an assist generation unit 428, a reference acquisition unit 430, and an assist transmission unit 432.

The layout acquisition unit 420 acquires layout information or referential image data transmitted from the form creation device 110 and stores it in the storage device 404.

The image acquisition unit 422 acquires image data generated by reading the form 152 from the scanner 140.

If the layout acquisition unit 420 has received referential image data beforehand, the image correction unit 424 corrects displacement and tilting in image data of the form 152 read by the scanner 140 based on the referential image data stored in the storage device 404. In the processing to correct displacement and tilting, if, for example, the referential image data corresponds to the entire form, the image correction unit 424 compares the image data read by the scanner 140 and the referential image data and corrects the read image data so that its degree of agreement with the referential image data may increase and, if the referential image data contains partial image data of the form and its attributes information (position and type), corrects the read image data so that image elements contained in the image data read by the scanner 140 may agree with the image data contained in the referential image data. The referential image data stored in the storage device 404 is correlated with, for example, a form ID of the form 152, so that the image correction unit 424 can refer to the referential image data that corresponds to the image data of the generated form 152.

It is to be noted that the referential image data not only provides a reference for the displacement and tilting correction processing but also used as information that identifies the form (that is, information (form ID) that identifies the layout information). That is, the storage device 404 may be configured to store layout information beforehand in a state where it is correlated with referential image data, and the OCR processing unit 426 may be configured to compare image data of the form read by the scanner 140 to the referential image data stored beforehand and conduct OCR processing on the read form image data by using the layout information correlated with the referential image data that agrees with this form image data most.

The OCR processing unit 426 reads the form 152's form ID described in the shape of the barcode 182d etc., by using as a reference, for example, the position of the reference mark 182c in an image given by the image data acquired by the image acquisition unit 422. Further, the OCR processing unit 426 reads the layout information containing that form ID from the storage device 404 and, based on the read layout information, conducts OCR processing on the image data of the form 152 read by the scanner 140 (processing to extracts contents such as characters and numbers denoted by the image data from this image data).

The OCR device 120 in the present embodiment conducts OCR processing based on layout information acquired from the form creation device 110, so that it is possible to know, for example, a position of the character frame 182a and a position at which the written information is read, thereby improving the accuracy in OCR processing. Moreover, as compared to a case where, for example, the printed form 152 is read with the scanner 140 to generate image data so that displacement and tilting may be corrected based on the image data, the OCR device 120 that conducts OCR processing based on the layout information and the referential image data is not affected by dust stuck to the form 152 or wrinkles in the form 152, so that the accuracy in OCR processing is improved. Further, the layout information generated in the form creation device 110 is used also in the OCR device 120 in common, so that the user need not perform the same setting both in the form creation device 110 and the OCR device 120 and so is relieved of heavy work burdens. Moreover, also in the case of modifying the layout information in order to meet a need to improve the OCR processing accuracy based on specification changes and the results of the OCR processing for the once printed form 152, similarly, the layout information modified in the form creation device 110 can be used in both of the form creation device and the OCR device 120, thereby mitigating the work burdens on the user.

Further, the layout information contains variable information that defines a variable form capable of changing, for example, the shape, the size 190i, the location, the number of subdivisions, etc. about the input region 184 in the form 152.

If no measures are taken in handling of such a variable form, the OCR processing unit 426 will have to estimate its input region 184 based on only the image data, so that appropriate OCR results cannot be obtained in some cases. To solve this problem, in the present embodiment, if the form creation device 110 has determined the shape, the size 190i, the location, the number of subdivisions, etc. of the variable information input region 184 in the layout information in response to a user's input and then the data output unit 172 has output to the printer 130 the layout information containing the determined variable information input region 184, the layout transmission unit 170 is triggered by the output by the data output unit 172, to transmit to the OCR device 120 the layout information containing the determined input region 184.

Further, in a case where the printer 130 is to determine the shape, the size 190i, the location, the number of subdivisions, etc. of the input region 184, the layout transmission unit 170 may be triggered by actual printout of the form 152 from the printer 130, to transmit the layout information containing this determined input region 184 to the OCR device 120.

In such a configuration, the OCR device 120 has a decided input region 184 in the layout information, so that it is possible to improve the OCR accuracy based on the accurate information of the input region 184 and reduce processing loads because the OCR processing target regions can be narrowed down.

Further, the layout information in this case may be the aforementioned referential image data of the layout of the form 152 in accordance with the user's input. For example, the OCR device 120 corrects the image data of the form 152 read with the scanner 140 by matching, for example, its ruled line position etc. with the referential image data, which is the layout information also, and then conducts OCR processing on it. Such a configuration also improves the accuracy in OCR processing.

The assist generation unit 228 generates assist information that assists generation of layout information. The generated assist information contains also reform information that denotes points to be reformed in the layout information. The algorithm information among the assist information has been described already, so that the following will describe in detail the reform information.

FIG. 9 is an explanatory table of reform information. In particular, FIG. 9A shows one example of the layout information, FIG. 9B shows one example of the reform information, and FIG. 9C shows one example of the reference data.

The assist generation unit 428 refers to such layout information about the input region 184 as shown in, for example, FIG. 9A, which has been acquired by the layout acquisition unit 420. Such layout information has already been described with reference to FIG. 4C, and repetitive description on it will be omitted.

Further, the assist generation unit 428 confirms whether written information is read successfully (success-or-failure in readout), which is denoted in the referenced layout information as a result of OCR processing by the OCR processing unit 426, about the subdivided input region 184 in which the written information should be able to be read. For example, in the case of reading handwritten characters, the OCR processing unit 426 crosschecks them against a reference character registered in the OCR processing software to compare a predetermined threshold value and an index value that denotes the degree of agreement with the characters decided to be most agreed with the reference character, thereby deciding the success-or-failure in readout. The threshold value can be changed through a user's input.

As shown in FIG. 9B, the assist generation unit 428 generates reform information that correlates the layout ID 190*a* which denotes the subdivided input region 184 in the layout information and the success-or-failure in readout (success-or-failure-in-readout 450) with each other, based on the results of the OCR processing.

In such a manner, as a result of OCR processing, for example, the reform information denotes a failure in readout in the subdivided input region 184 in which written information should originally be able to be read. Based on the reform information, the layout generation unit 160, for example, fills with a red color the subdivided input region 184 in which readout failed or reddens the character frame 182*a* that surrounds this subdivided input region 184, thereby prompting the user for reformation. Then, in response to a user's input, the layout information is modified, for example, the input region 184 or the size 190*i* of the character 182*b* is increased, to improve the accuracy in OCR processing.

In such a configuration of using the reform information, the success-or-failure in readout of written information is automatically presented, to eliminate the need for confirming it for each of the input regions 184, thereby mitigating the work burdens on the user and also avoiding a situation of overlooking points that need to be reformed.

Further, reference data generated by the reference generation unit 168 in the aforementioned form creation device 110 can be used to make the reform information more useful for the purpose of efficient reformation. The reference data generated by the reference generation unit 168 is not contained in the layout information and used in a test to confirm the accuracy in OCR processing. The reference data contains the layout ID 190*a* which denotes the subdivided input region 184 as well a size 460*a* of a character and a content 460*b* to be written by the user into the subdivided input region 184 for testing as shown in, for example, FIG. 9C.

In this case, a character having, for example, the size 460*a* or the content 460*b* defined in reference data beforehand is written into the subdivided input region 184 in the form 152. Further, besides handwritten characters, any character defined in the reference data may be printed with the printer 130. In this case, no matter whether the character is well written or not by the user, the OCR processing accuracy is improved by securely detecting a failure in readout caused by distortion etc. in an image generated by the scanner 140. Then, the image acquisition unit 422 in the OCR device 120 acquires the image data of that form 152 via the scanner 140.

The reference acquisition unit 430 acquires reference data transmitted by the layout transmission unit 170. The assist generation unit 428 generates reform information based on the reference data acquired by the reference acquisition unit 430 and the results of OCR processing.

The assist generation unit 428 generates reform information by comparing the reference data which denotes a character etc. whose, for example, size 460*a* or content 460*b* is defined and the results of OCR processing on image data of the form 152 in which characters etc. are actually written. The thus generated reform information is transmitted by the later-described assist transmission unit 432 to the form creation device 110. The form creation device 110 modifies layout information based on the reform information. In such a configuration to use the reference data, it is possible to conduct detailed comparison on character misrecognition etc., thereby improving accuracy in reformation of the layout information.

As described above, by using assist information such as the algorithm information and the reform information, information that can be known on the side of the OCR device 120 can be used in common also by the form creation device 110, so that the layout generation unit 160 in the form creation device 110 can generate layout information on which OCR processing can be performed easily.

The assist transmission unit 432 transmits assist information generated by the assist generation unit 428 to the form creation device 110.

The form creation device 110 and the OCR device 120 hereinbefore described improve the accuracy in OCR processing while greatly reducing work burdens on the user. Further, the present invention will provide a form generation program causing a computer to function as the form creation device 110, an OCR processing program causing it to function as the OCR device 120, and a computer-readable storage medium storing the form creation program or the OCR processing program such as a flexible disk, a magneto-optical disk, an ROM, an EPROM, an EEPROM, a compact disk (CD), a digital versatile disk (VDV), or a blue-ray disc (BD). Here, the program refers to data processing means described in an arbitrary language or description method.

Further, the form creation program and the OCR processing program may be stored in an arbitrary application program server connected to the form creation device 110 or the OCR device 120 via the communication network 150 so that all or part of them can be downloaded as required.

(Form Processing Method)

Figure 10:
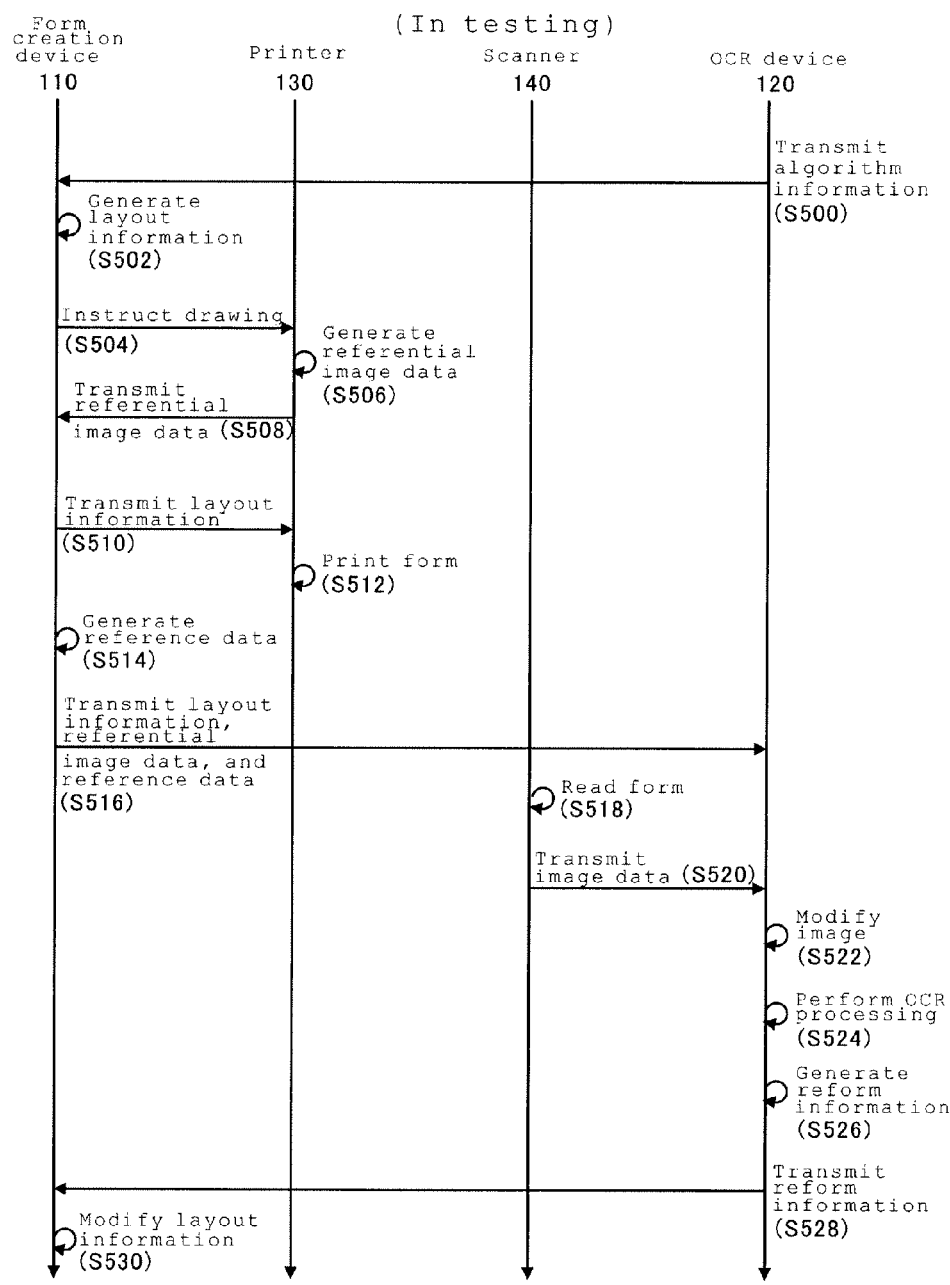
FIG. 10 is a sequence diagram showing a flow of overall processing in testing of a form processing method.

Next, a description will be given of the form processing method for operation of the aforementioned form processing system including the form creation device 110 and the printer 130. FIG. 10 is a sequence diagram showing the flow of overall processing in testing of the form processing method and FIG. 11 is a sequence diagram showing the flow of overall processing in operation of the form processing method.

As shown in FIG. 10, if the OCR device 120 transmits assist information containing algorithm information to the form creation device 110 (S500), the form creation device 110 causes the layout generation unit 160 to generate the layout information that denotes a layout of the form 152 based on a user's input (S502). The drawing instruction unit 162 transmits an instruction for the generation of referential image data to the printer 130 (S504) and then the drawing performing unit 220 in the printer 130 generates referential image data (S506) and transmits the generated referential image data to the form creation device 110 (S508). Then, in accordance with the input for printing the form 152, the data output unit 172 converts the layout information having the determined input region 184 into a printout-appropriate format and outputs it to the printer 130 (S510). The printer 130 prints the form 152 (S512). Then, the reference generation unit 168 generates reference data based on the layout information having the determined input region 184 (S514). The layout transmission unit 170 transmits the layout information and the reference data and the image transmission unit 164 transmits the referential image data to the OCR device 120 respectively (S516). The user writes a character etc. denoted by the reference data displayed, for example, on the display unit 154 and having the defined size 460*a* and content 460*b*.

After the information is written on the printed form 152, the scanner 140 reads the form 152 on which the information is written (S518) and transmits image data to the OCR device 120 (S520). The image correction unit 424 in the OCR device 120 corrects displacement and tilting in the image data generated by the scanner 140 by reading the form 152 based on the referential image data (S522). The OCR processing unit 426 performs OCR processing on the image data based on the layout information (S524). Then, the assist generation unit 428 generates reform information based on the results of the OCR processing and the reference data (S526). The assist transmission unit 432 transmits the reform information to the form creation device 110 (S528). The layout generation unit 160 in the form creation device 110 prompts the user for reformation based on the reform information so that the layout information may be modified (S530).

Figure 11:
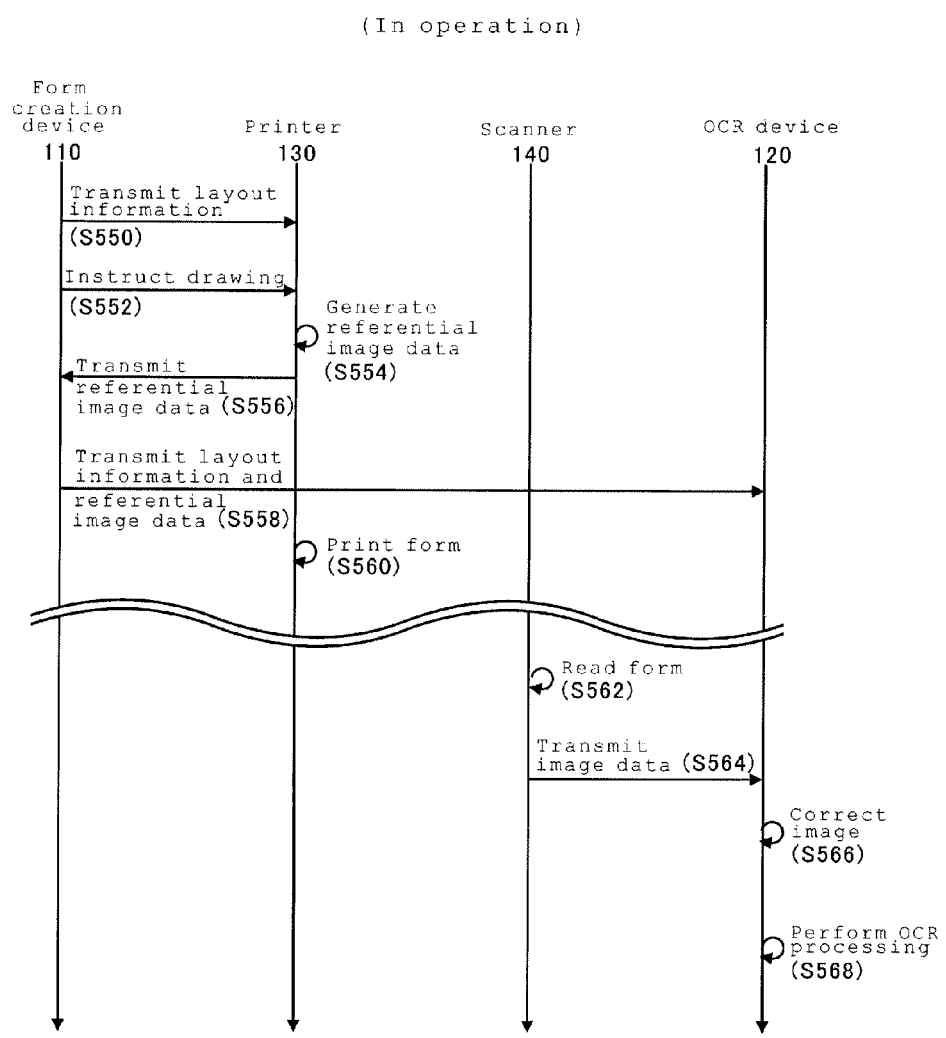
FIG. 11 is a sequence diagram showing a flow of overall processing in operation of the form processing method.

In operation, as shown in FIG. 11, in accordance with an input for printing of the form 152, the data output unit 172 in the form creation device 110 converts the layout information having the determined input region 184 into a printout-appropriate format and outputs it to the printer 130 (S550). The drawing instruction unit 162 transmits an instruction for the generation of referential image data to the printer 130 (S552) and then the drawing performing unit 220 in the printer 130 generates the referential image data (S554) and transmits the generated referential image data to the form creation device 110 (S556). The layout transmission unit 170 in the form creation device 110 transmits the layout information to and the image transmission unit 164 transmits the referential image data to the OCR device 120 respectively (S558). The printer 130 prints the form 152 (S560). The layout information of the form 152 at this point in time is assumed to have been modified on the basis of the reform information already through the form processing method shown in FIG. 10.

Then, the user describes job-related information on the form 152 by handwriting, the form 152 is read by the scanner 140 (S562), and the read image data is transmitted to the OCR device 120 (S564). Then the image correction unit 424 in the OCR device 120 corrects displacement and tilting in the image data generated by the scanner 14 by reading the form 152 based on the referential image data (S566). Then, the OCR processing unit 426 performs OCR processing on the corrected image data, to acquire the written information (S568). The layout of such image data is already modified in FIG. 10, thereby increasing the accuracy in OCR processing.

Figure 12:
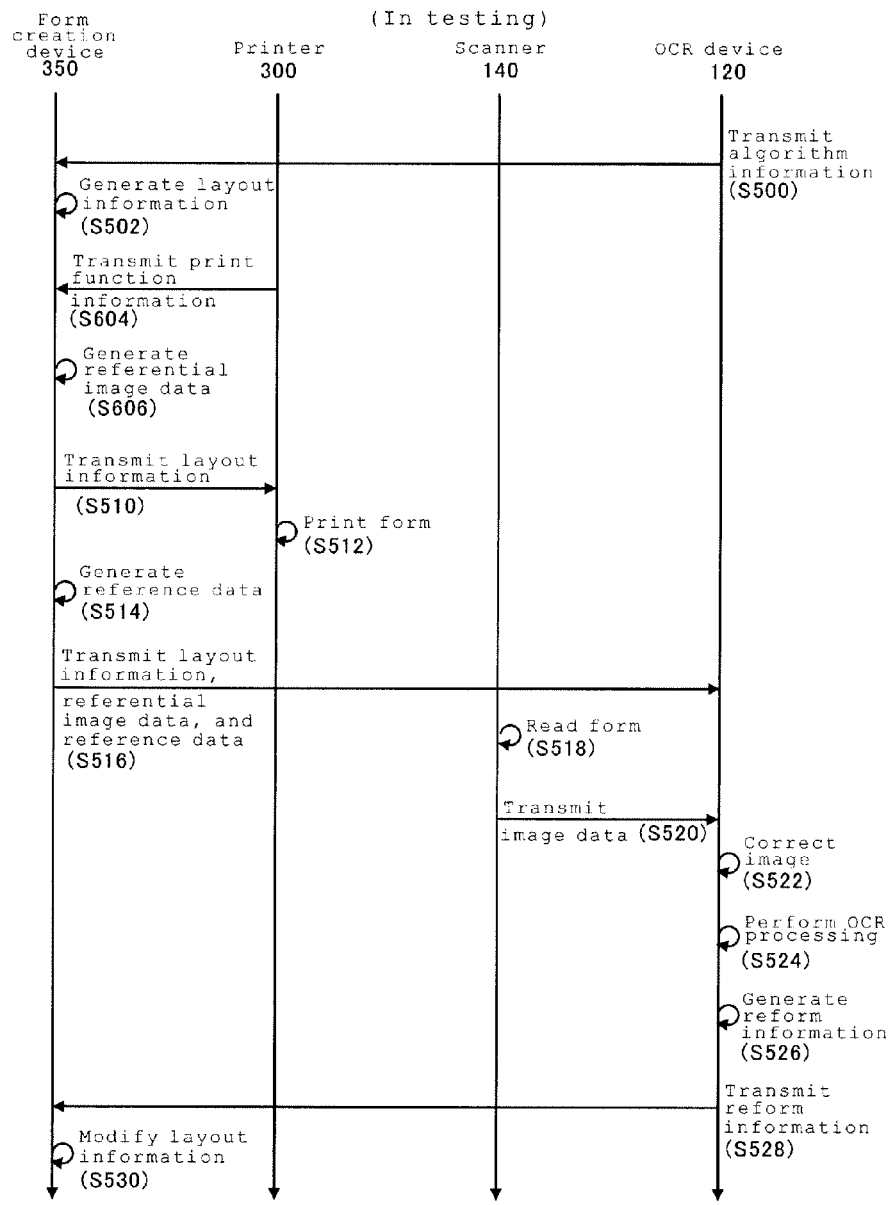
FIG. 12 is a sequence diagram showing a flow of overall processing in testing of another form processing method.
Figure 13:
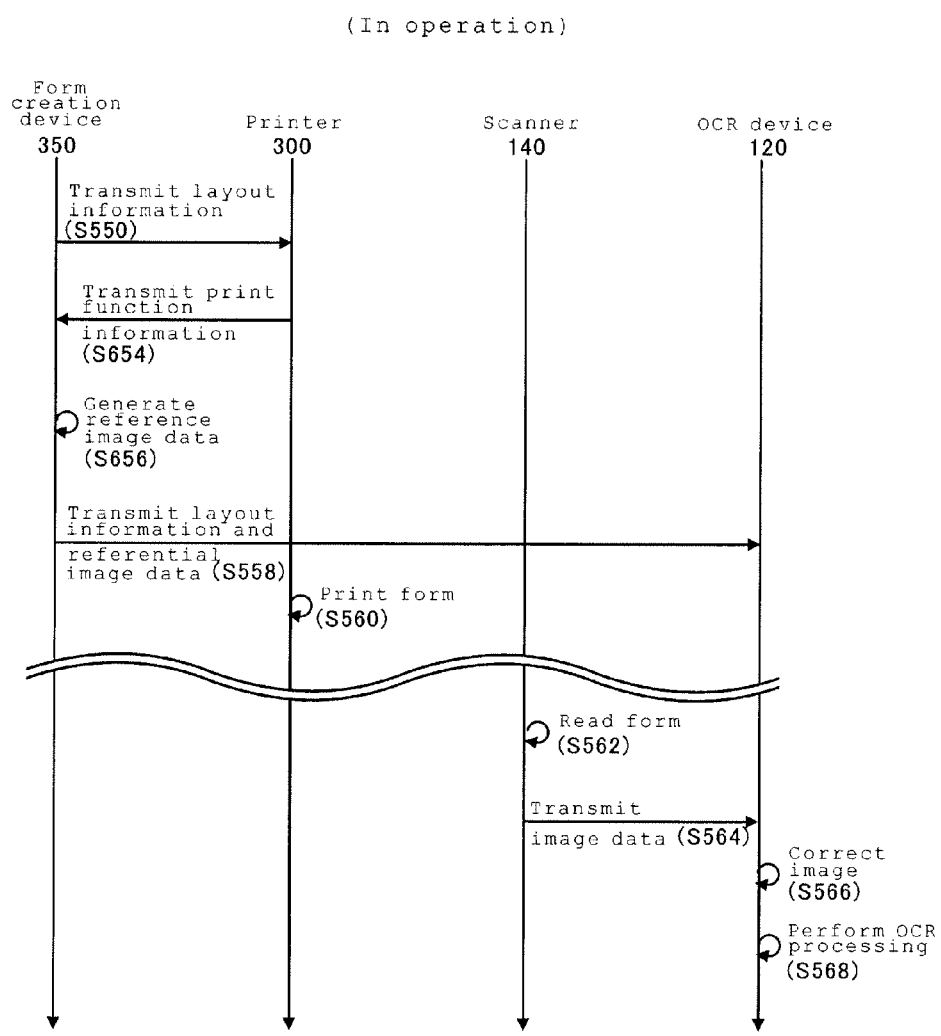
FIG. 13 is a sequence diagram showing a flow of overall processing in operation of another form processing method.

Subsequently, a description will be given of a form processing method for operating the form processing system including the form creation device 350 and the printer 300. FIG. 12 is a sequence diagram showing the flow of overall processing in testing of another form processing method and FIG. 13 is a sequence diagram showing the flow of overall processing in operation of this form processing method.

As shown in FIG. 12, if the OCR device 120 transmits assist information containing algorithm information to the form creation device 350 (S500), the layout generation unit 160 in the creation device 350 generates layout information that denotes a layout of the form 152, based on a user's input (S502).

The function transmission unit 320 in the printer 300 transmits print function information that denotes print functions to the form creation device 350 in accordance with, for example, an instruction from the form creation device 350 (S604). The drawing performing unit 372 generates referential image data based on the print function information and the layout information (S606).

Hereinafter, the functions described from the layout information transmission step of S510 to the layout information modification step of S530 are essentially the same as those described with reference to FIG. 10 and so assigned identical reference numerals, and the repetitive description on them will be omitted.

In operation, as shown in FIG. 13, in accordance with an input for printing of the form 152, the data output unit 172 in the form creation device 350 converts the layout information having the determined input region 184 into a format appropriate for printing and outputs it to the printer 300 (S550). The function transmission unit 320 in the printer 300 transmits print function information that denotes print functions to the form creation device 350 in accordance with, for example, an instruction from the form creation device 350 (S654). The drawing performing unit 372 generates referential image data based on the print function information and the layout information (S656).

Hereinafter, the functions described from the layout information transmission step of S558 to the OCR processing step of S568 are essentially the same as those described above with reference to FIG. 11 and so assigned identical reference numerals, and repetitive description on them will be omitted.

According to such a form processing method, both in testing shown in FIGS. 10 and 12 and in operation shown in FIGS. 11 and 13, it is possible to improve the accuracy in OCR processing by using layout information modified on the basis of reform information while mitigating work burdens on the user.

Although there has been hereinabove described the preferred embodiment of the present invention with reference to the accompanying drawings, of course, it should be appreciated that the present invention is not limited thereto. Accordingly, any and all modifications and variations which is conceivable to those skilled in the art should be considered to be within the scope of the present invention as defined in the appended claims.

It is to be noted that the steps in the form creation method in the present specification need not necessarily be performed in a time-series manner along the order described in the flowchart and may follow concurrent processing or subroutine-based processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A form processing system comprising a form creation device and a printer, wherein the form creation device includes:
    a layout generation unit that generates layout information denoting a layout of a form;
    a drawing instruction unit that causes a drawing performing unit in the printer to generate referential image data which corresponds to at least part of the layout and which is image data obtained by rasterizing at least part of the layout information in a bitmap format, based on the generated layout information;
    an image transmission unit that transmits the generated referential image data to an OCR device; and
    the printer includes the drawing performing unit that generates the referential image data which is image data obtained by rasterizing at least part of the layout information in a bitmap format, in accordance with an instruction from the drawing instruction unit, and
    wherein the drawing instruction unit inputs a print job to call up the drawing performing unit and causes this drawing performing unit to generate the referential image data based on this print job and, after this generated referential image data is acquired completely, cancels this print job.

2. The form processing system according to claim 1, wherein if there are a plurality of the drawing performing units, the drawing instruction unit causes any one of the followings; all of those drawing performing units to generate the referential image data; only predetermined one of those drawing performing units to generate the referential image data; all of those drawing performing units to generate and combine the referential image data; or only user-selected one of those drawing performing units to generate the referential image data.

3. The form processing system according to claim 1, wherein the form creation device further includes:
   a layout transmission unit that transmits the generated layout information to the OCR device,
   the form processing system further comprising an OCR device that includes:
   a layout acquisition unit that acquires the layout information transmitted from the form creation device;
   an OCR processing unit that performs OCR processing on image data of the form read by a scanner, based on the acquired layout information and the generated referential image data; and
   an image correction unit that compares the image data read by the scanner and the referential image data and corrects displacement and tilting in the read image data so that the read image data may agree with the referential image data.

4. The form processing system according to claim 3, wherein the OCR device further includes: an assist generation unit that generates assist information assisting the generation of the layout information; and an assist transmission unit that transmits the assist information to the form creation device, the form creation device further includes an assist acquisition unit that acquires the transmitted assist information, and the layout generation unit generates the layout information based on the acquired assist information.

5. The form processing system according to claim 4, wherein the assist information contains algorithm information about an algorithm which is used in an OCR processing unit in the OCR device.

6. The form processing system according to claim 4, wherein the assist generation unit generates reform information that denotes points to be reformed of the acquired layout information, based on results of the OCR processing, and the assist information contains the reform information.

7. The form processing system according to claim 6, wherein the form generation device further includes a reference generation unit that generates reference data that provides a reference for comparison to the results of the OCR processing based on the generated layout information, the layout transmission unit transmits the reference data to the OCR device, the OCR device further includes a reference acquisition unit that acquires the transmitted reference data, and the assist generation unit generates the reform information based on the acquired reference data and the results of the OCR processing.

8. The form processing system according to claim 1, wherein the form creation device further includes a data output unit that outputs the generated layout information to the printer, the generated layout information contains variable information that defines a variable form in which an input region is variable, and if the data output unit outputs the layout information having the determined input region in the variable information to the printer, the layout transmission unit transmits the layout information having the determined input region to the OCR device.

9. The form processing system according to claim 1, further comprising an image scanner, wherein the form creation device further includes: an output control unit that controls the printer so that printing may be performed under predetermined conditions in a case where the form is printed with this printer; and a readout control unit that controls the image scanner in a case where the form is read with this image scanner.

10. A form processing system comprising a printer and a form creation device, wherein the printer includes a function transmission unit that transmits print function information denoting print functions to the form creation device, and the form creation device includes: a layout generation unit that generates layout information denoting a layout of a form; a drawing performing unit that generates referential image data which corresponds to at least part of the layout information based on the print function information and the generated layout information; and an image transmission unit that transmits the generated referential image data to an OCR device; and
   wherein the drawing instruction unit inputs a print job to call up the drawing performing unit and causes this drawing performing unit to generate the referential image data based on this print job and, after this generated referential image data is acquired completely, cancels this print job.

11. A form creation device comprising: a layout generation unit that generates layout information denoting a layout of a form; a drawing instruction unit that causes a drawing performing program for a printer to generate referential image data which corresponds to at least part of the generated layout information, based on the generated layout information; and an image transmission unit that transmits the generated referential image data to an OCR device; and wherein the drawing instruction unit inputs a print job to call up the drawing performing unit and causes this drawing performing unit to generate the referential image data based on this print job and, after this generated referential image data is acquired completely, cancels this print job.

12. A non-transitory computer-readable medium storing thereon a computer program used in a computer, the computer program causing the computer to function as: a layout generation unit that generates layout information denoting a layout of a form; a drawing instruction unit that causes a drawing performing program for a printer to generate referential image data which corresponds to at least part of the generated layout information, based on the generated layout information; and an image transmission unit that transmits the generated referential image data to an OCR device; and wherein the drawing instruction unit inputs a print job to call up the drawing performing unit and causes this drawing performing unit to generate the referential image data based on this print job and, after this generated referential image data is acquired completely, cancels this print job.

* * * * *